US011965128B2

(12) United States Patent
Hamza et al.

(10) Patent No.: US 11,965,128 B2
(45) Date of Patent: Apr. 23, 2024

(54) POLYMERIC GELS FOR OIL AND GAS CONFORMANCE CONTROL APPLICATIONS AND METHODS OF MAKING SAME

(71) Applicants: Qatar University, Doha (QA); Qatar Foundation for Education, Science and Community Development, Doha (QA)

(72) Inventors: Ahmed Hamza, Doha (QA); Ibnelwaleed Ali Hussein, Doha (QA); Mohamed Shamlooh, Doha (QA); Mustafa Nasser, Doha (QA); Musaab Magzoub, Doha (QA); Saeed Salehi, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 0 days.

(21) Appl. No.: 17/631,335

(22) PCT Filed: Jul. 29, 2020

(86) PCT No.: PCT/QA2020/050009
§ 371 (c)(1),
(2) Date: Jan. 28, 2022

(87) PCT Pub. No.: WO2021/020980
PCT Pub. Date: Feb. 4, 2021

(65) Prior Publication Data
US 2022/0363970 A1 Nov. 17, 2022

Related U.S. Application Data

(60) Provisional application No. 62/880,845, filed on Jul. 31, 2019.

(51) Int. Cl.
*E21B 33/138* (2006.01)
*C08J 3/11* (2006.01)
(Continued)

(52) U.S. Cl.
CPC .............. *C09K 8/035* (2013.01); *C08J 3/11* (2013.01); *E21B 21/003* (2013.01); *E21B 33/138* (2013.01); *C08J 2333/26* (2013.01)

(58) Field of Classification Search
None
See application file for complete search history.

(56) References Cited

U.S. PATENT DOCUMENTS

| | | | |
|---|---|---|---|
| 9,784,079 B2 * | 10/2017 | Salla | C09K 8/508 |
| 2007/0249504 A1 * | 10/2007 | Ballard | C09K 8/512 |
| | | | 507/221 |
| 2018/0112054 A1 * | 4/2018 | Steiner, III | C08G 18/092 |

* cited by examiner

*Primary Examiner* — Andrew Sue-Ako
(74) *Attorney, Agent, or Firm* — K&L Gates LLP (57) ABSTRACT

A gel material for oil and gas conformance control operations is provided. The gel material includes a plurality of gel material components including polyacrylamide, triamine silica, and nanosilica which are added in suitable amounts to form the gel material under a gel formation condition. The present technology replaces and/or supplements conventional crosslinkers and provides enhanced polymeric gels, such as, for oil and gas field applications including wellbore strengthening, loss circulation materials, and water shut-off applications, at high temperatures. The present technology is compatible with fresh and high salinity water.

10 Claims, 4 Drawing Sheets
(4 of 4 Drawing Sheet(s) Filed in Color)

a)

b)

(51) Int. Cl.
*C09K 8/035* (2006.01)
*E21B 21/00* (2006.01)

POLYMERIC GELS FOR OIL AND GAS CONFORMANCE CONTROL APPLICATIONS AND METHODS OF MAKING SAME

PRIORITY CLAIMS

The present application is a National Stage filing under 35 U.S.C. 371 of International Application No. PCT/QA2020/050009, filed on Jul. 29, 2020, which claims priority to U.S. Ser. No. 62/880,845, filed on Jul. 31, 2019, the entire contents of which are being incorporated herein by reference.

BACKGROUND

Engineers in oil and gas wells commonly face conformance problems. Conformance deals mainly with excessive water/gas production or conning in oil and gas well making the production process, at some point, infeasible. Although cement casing is usually placed around the wall of the well, water tends to leak through the casing or flow behind the pipes after a while in the high-pressure operation. Water in oil and gas wells can be naturally present water and/or water injected into the reservoir. High water production adds costs for handling and disposing facilities. Water can also cause reduction in hydrocarbons recovery and corrosion problems.

Conformance control strategies for water shut-off include mechanical control using, for example, packers and cement plugs. However, these have limited applications. Chemical control strategies are also used, for example, gelling polymers and resins.

Additionally, in oil or gas well drilling, lost circulation occurs when drilling fluid flows into one or more geological formations instead of returning up the annulus. Lost circulation can be a serious problem during the drilling of an oil well or gas well. Loss circulation causes leakage of drilling fluids inside the formation thereby leading to extended non-productive time. Conventional loss circulation materials (LCMs), such as mica and calcium carbonates, are greatly affected by high-pressure high-temperature (HPHT) conditions in deep sandstone and carbonate reservoirs resulting in poor performance. Further, cementing operations suffer from long waiting time for the cement to harden.

Polymers such as polyacrylamide (PAM) and polyacrylamide tert-butyl acrylate (PAtBA) crosslinked with polyethyleneimine (PEI) can be used in conformance control applications because of their high thermal stability and the controllable crosslinking rate at high temperatures. The gelation mechanism and crosslinking is illustrated in paragraph of priority U.S. Provisional Application No. 62/880,845 which is incorporated herein by reference.

However, high cost of the PEI limits the use of such systems.

SUMMARY

According to one non-limiting aspect of the present disclosure, a method of forming a gel material includes providing a plurality of gel material components including polyacrylamide, triamine silica, and nanosilica in an amount suitable to form the gel material; and processing the gel material components under a gel formation condition to form the gel material.

According to another non-limiting aspect of the present disclosure, the gel material is formed in a reservoir during an oil and gas drilling operation.

According to another non-limiting aspect of the present disclosure, the gel material is formed in an oil and gas reservoir during a shut off operation.

According to another non-limiting aspect of the present disclosure, the gel material is formed in an oil and gas drilling well to provide a loss circulation material.

According to another non-limiting aspect of the present disclosure, a gel material for an oil and gas drilling operation includes a plurality of gel material components including polyacrylamide, triamine silica, and nanosilica which are added in a suitable amount to form the gel material under a gel formation condition.

Additional features and advantages are described herein, and will be apparent from the following Detailed Description and the figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of the present technology described herein may be better understood by reference to the accompanying figures in which.

The reader will appreciate the foregoing details, as well as others, upon considering the following detailed description of certain non-limiting embodiments of the present technology according to the present disclosure. The reader may also comprehend certain of such additional details upon using the present technology described herein.

DETAILED DESCRIPTION

The present technology provides polymeric gels formed by new systems based on Triamine silica (TAS) crosslinking polyacrylamide polymers and copolymers, such as PAM/Triamine silica (TAS) combined with nanosilica (NS), which have enhanced performance over PAM/PEI or PAtBA/PEI formulations. The crosslinkers of the present technology have superior properties over conventional crosslinkers, such as PEI, chitosan or inorganic crosslinkers such as chromium, for example, in terms of final gel strength and thermal stability. The crosslinking systems of the present technology can fully replace and also supplement conventional crosslinkers (e.g., PEI) to reduce the cost.

The present technology provides enhanced performance over existing polymeric gels, such as, for oil and gas well drilling operations, such as wellbore strengthening, LCMs, and water shut-off applications, at high temperatures, for example, above 90° C.

For example, the present technology can be used for preventing or reducing loss circulation during drilling operations when loss circulation is expected or encountered. The present technology can be used alone or together with other materials, such as drilling fluids and completion fluids. The treatment can include a proactive method, such as treatment of the potential loss zones, and a reactive method, such as treatment after loss occurs. For the proactive method, the fractured or lost circulation zones can be drilled using the gel formulated drilling fluid in low concentration depending on the severity of the expected loss. After passing the risk zone, drilling can continue with the regular planned drilling fluids. For the reactive method, the gel formulation can be used as a spotting pill. The pill can be used in a relatively small quantity, for example, less than 200 bbls, spotted where the losses occur and allowed to stand there for a short period until it gels and seals the loss zones. In both methods, the fluid can be pumped using the drill string, there is no need for a circulation sub, and the fluids can be easily pumped through bit's nozzles since there is no large solid particles to plug the nozzles.

As another example, the present technology can be used for water shut-off applications. For example, the polymer and crosslinker of the present technology can be mixed at surface temperature and then injected through the well tubing. Reaction between the carboxylate groups in the polymer ad crosslinker and formation of the 3-D gel structure can happen underground.

The present technology is compatible with fresh and high salinity water. Further, in an environment of high salinity water, such as seawater, a chelating agent, such as ethylene diamine tetra acetic acid (EDTA), can be used to improve compatibility and reduce the impact of salts on formation permeability by preventing calcium sulfate scale. Low concentration up to 1 wt. % of EDTA is preferred to avoid any side effects on the gel strength. Other examples of chelating agents include Diethylenetriamine Pentaacetic Acid (DTPA) and Hydroxy ethylethylenediaminetriacetic acid (HEDTA).

EXAMPLES

Example 1. Preparation

As non-limiting examples, the present technology can be prepared using these materials: polyacrylamide (PAM) with a low molecular weight, for example, around 600,000 to 800,000 Da, to facilitate the pumping process from the surface, and polyacrylamide tert-butyl (PAtBA) were received from SNF floerger, France. PEI (650,000-850,000 Daltons) was acquired from Polysciences, Canada. The present system can replace the PEI or reduces its percent in the solution. If PEI is used, low molecular weight is preferred to avoid high viscosity of the solution for pumping issues. Triamine silica (TAS) (functionalized silica) was purchased from Silicycle, Canada. Non-functionalized nanosilica with a size of 50 nm was obtained from Nyacol Inc. Canada. Greater than 1 wt. % of the non-functionalized nanosilica is preferred to have a stable system without any settling of the TAS. The concentration of nanosilica can be adjusted based on the size of TAS.

The present system can be prepared using ultra-pure deionized water. Seawater with high salinity (Table 1) can be used to study the effect of salinity on the formulated polymer system. Ethylene diamine (Na-ETDA), DTPA, HEDTA, or a derivative thereof with a low concentration (e.g., 1 wt. %, to avoid scale precipitate) can be mixed with the polymeric formulation to inhibit precipitations of salts within the reservoir.

TABLE 1

| Composition of seawater | |
| --- | --- |
| Salt | Concentration, gm/L |
| $NaHCO_3$ | 0.2382 |
| $Na_2SO_4$ | 6.5754 |
| $CaCl_2 \cdot H_2O$ | 2.3945 |
| $MgCl_2 \cdot 6H_2O$ | 18.0539 |
| NaCl | 40.2738 |

Field produced water and formation water can also be used.

The present polymer systems can be prepared using 9 wt. % PAM with different concentrations of PEI, TAS and NS. The concentrations of polymers can be adjusted based on the viscosity range targeted for pumping and the gel strength required. NS can be added to the PAM, and the resultant mixture can then be subjected to a mixing step, such as by sonication for 8-12 minutes. Stirring can be used too. The mixing step ensures well dispersion of the nanoparticle. The suitable mixing time can be chosen to achieve well dispersion of the particles by a particular mixing method. TAS can then be added, and the resultant mixture can be exposed to another 8-12 minutes of sonication or stirring for a suitable time. In some embodiments of the present technology, PEI can also be added to the mixture, and the mixture is then stirred for a suitable time for good particles distribution, for example, 10 minutes.

The formulated fluids were then submerged in an oil bath that can withstand high temperature without decomposition (such as silicon oil) at about 130° C. for about 24 hours. Typically, the crosslinking can be accomplished in approximately 70 minutes. However, one day aging can be applied to ensure full crosslinking for the samples. At the room temperature, the mixture of the polymer/crosslinker has low viscosity, and the gel will be formed after a period of time depending on the temperature. As the temperature increases, the gel will be formed faster. The most preferred range is above 90° C. This step is to test the forming of the gel in the reservoir conditions.

Example 2. Evaluation

The present technology can produce gels with much improved strength. The produced gel samples can be compared with the Sydansk visual code system. Rheological tests can also be performed on the produced gels, for example, in the frequency range of 0.25 to 50 rad/s using Anton Paar rheometer (MCR 302) with parallel plate (25 mm) geometry and 2 mm gap. In some tests, the strain was fixed at 1 wt. % and values at a frequency of 10 Hz were used to compare different systems. Differential scanning calorimetry (DSC) can be used to investigate the gelation kinetics of the present system.

The DSC technique illustrated that crosslinking using the present technology was accomplished via imine group with the advantage of better strength and stability due to the presence of silica. For example, the obtained results showed that TAS was able to form a gel with code "E" according to the Sydansk visual code. Addition of low concentration (0.5-4 wt. %) of 20-80 nm silica successfully prevented the settling of micro-sized TAS and reinforced the gelant system (code "I"). The nanosilica has two functions: stabilize the solution by preventing TAS settling and reinforcing the forming gel. Therefore, the concentration and size of the nanosilica depend on the concentration and size of the TAS and the targeted gel strength.

The reinforced gel of the present technology has been proved to possess properties that surpass typical polymeric gels (such as PAM/PEI and PAtBA/PEI). Compared to typical polymeric gels, the present technology has such advantages as higher gel strength, higher thermal stability, reduced cost, and compatibility with high salinity water among others.

Example 2-1. Crosslinkability of Different Polymers Using TAS Crosslinker without PEI Polyacrylamide polymers are crosslinked with PEI via amine group. The ability of TAS with two polyacrylamide based polymers (PAM and PAtBA) were evaluated using 9 wt. % of the polymer and 2 wt. % TAS at 130° C. without adding PEI. The concentrations of the polymer and the crosslinker can be selected according to the desired stability of the gel. Very low or very high ratios might not be suitable, and gel will not be obtained. Whenever a suitable polymer/TAS concentration is selected, the gel will be formed. Very low ratios or over crosslinking would result in either no gel or gel decomposition. A temperature higher than 90° C. is preferred for the crosslinking. The temperature controls the rate of crosslinking, and the higher the temperature the faster the crosslinking rate.

Figure 1:
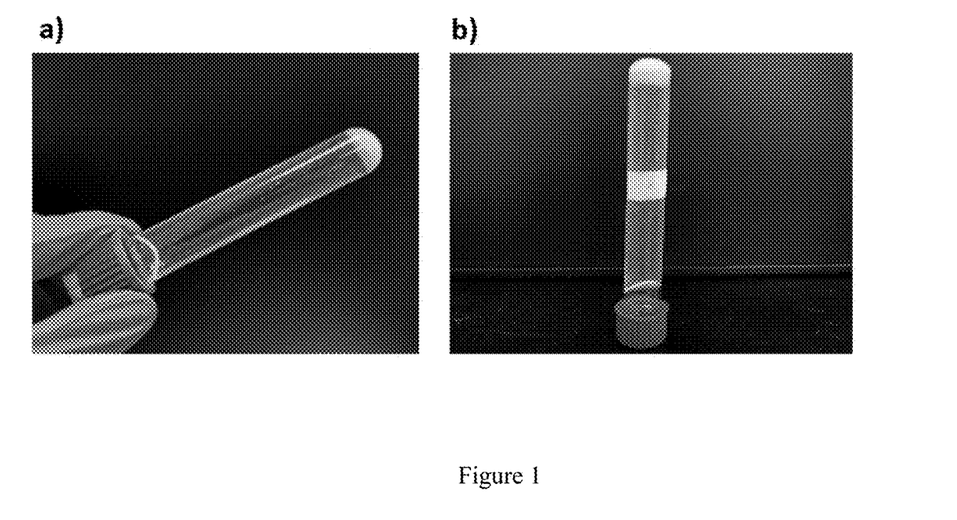
FIG. 1 shows the gels produced using 2 wt. % TAS crosslinker with 9 wt. % of the polymer: a) PAM and b) PAtBA.

FIG. 1 shows the gel samples (a) PAM b) PAtBA produced using TAS. TAS was able to crosslink both PAM and PAtBA. FIG. 1 shows settling of silica, which can be attributed to the micro size of the functionalized silica (30-100 μm) with the concentrations of the polymer and the crosslinker used. Triamine functional group can be attached to any size. Lower size is preferred for stability of the solution, but it might increase the cost of the material since the synthesis process on nano-scale is complex. In some non-limiting examples, micro-scale may be preferred, and nanosilica can be added in the system to solve the stability issue. In some non-limiting examples, triamine functional group can be attached on nanosilica to form a functionalized nanosilica that could produce a gel without the need to add nonfunctionalized nanosilica. Generally, any extra concentration causing settling may be considered excess. In some non-limiting examples, 2 wt. % TAS can used to produces a gel with strength almost similar to 1 wt. % PEI to have a high number of functional groups on the surface of microsilica. A lower concentration (e.g., 1-2 wt. %) could form a weak gel. The amount of silica that remained suspended was enough to crosslink both polymers as shown in FIG. 1.

Figure 2:
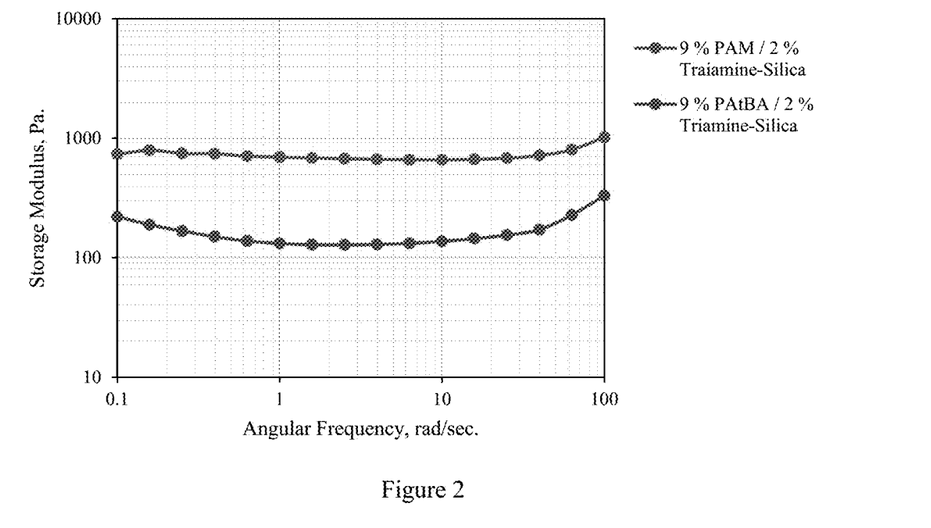
FIG. 2 shows the storage moduli of the gel formed by using 9 wt. % PAM or PAtBA crosslinked by 2 wt. % TAS.

The rheological behavior of these gel samples were tested as presented in FIG. 2, which indicates that the gel produced from crosslinking the PAM is more rigid than the second system in which the polymer is PAtBA. The difference in molecular weight between the two systems played an important role as the higher molecular weight polymer (PAM) which has a higher viscosity was able to suspend more silica particles resulting in more crosslinking. These interactions were reflected by the higher gel strength achieved in PAM (659 Pa) compared to PAtBA (136 Pa).

Example 2-2. Effect of Unfunctionalized Nanosilica

Nanosilica is introduced to the system to enhance both the stability of the particles and the physical strength of the gel. Table 2 shows the Sydansk codes of different gels formed after crosslinking 7-9 wt. % PAM by TAS at various concentrations before and after adding nanosilica. The concentration of the polymer depends on the targeted application and gel strength required. At low nanosilica concentrations, e.g., 0.1 to 2 wt. %, settling behavior was not much affected whereas addition of 2 wt. % nanosilica almost completely inhibited the settling and strengthened the composed gel.

TABLE 2

Sydansk codes of the formed gels using TAS and TAS/nanosilica to crosslink PAM and silica settling.

| # | Polymer System | Sydansk Code | Silica Settling |
|---|---|---|---|
| 1 | 9% PAM/0.1% Triamine-Silica | A | No |
| 2 | 9% PAM/0.5% Triamine-Silica | B | No |
| 3 | 9% PAM/1% Triamine-Silica | C | Yes |
| 4 | 9% PAM/2% Triamine-Silica | E | Yes |
| 5 | 9% PAM/0.5% Nanosilica/2% Triamine-Silica | F | Yes |
| 6 | 9% PAM/2% Nanosilica/2% Triamine-Silica | I | No |

Addition of nanosilica improves the gel strength of the PAM/TAS system. Table 3 shows the results of gel strength for 9 wt. % PAM mixed with different concentrations of TAS and nanosilica (50 nm) as measured at 10 Hz and 1% strain. Lower strains could be used as long as in the linear viscoelastic range. Various nanosilica concentrations prevented the settling of TAS. The high storage modulus of 1901 Pa was achieved upon the addition of 1 wt. % nanosilica compared to 1542 and 1868 Pa for 1.5 and 2 wt. %, respectively. The gel strength sharply increased when more nanosilica was added with the highest value at 9014 Pa which is about 374% greater compared to the storage modulus at 1 wt. % nanosilica. The ratio of NS depends on the TAS size. At the tested range 1 wt. % NS is enough to prevent TAS settling. Increasing the concentration of NS increases the gel strength. Lower or higher PAM concentrations can be used depending on the ratio of TAS. Too low or high wt. % of PAM might provide weak gel or unstable gel that could degrade because of the over crosslinking.

TABLE 3

Results of Storage moduli for 9 wt. % PAM and different nanosilica (NS) and TAS concentrations

| Type | Concentrations, wt. % | Sydansk Code | Storage Modulus, Pa |
|---|---|---|---|
| PEI | 1 | F | 1670 |
| NS/PEI | 2/1 | I | 5456 |
| NS/TAS | 1/2 | H | 1901 |
| NS/TAS | 1.5/2 | H | 1542 |
| NS/TAS | 2/2 | I | 1868 |
| NS/TAS | 4/2 | I | 4854 |
| NS/TAS | 6/2 | I | 9014 |
| NS/TAS/PEI | 2/0.1/0.9 | H | 1876 |
| NS/TAS/PEI | 2/0.5/0.5 | E | 727 |
| NS/TAS/PEI | 2/0.9/0.1 | C | 162 |

The storage modulus of 9 wt. % PAM crosslinked with PEI at various ratios (0.1, 0.5 and 0.9 wt. %) as base fluids were compared to the new formulations after adding TAS (0.9, 0.5 and 0.1 wt. %) to complete the percent of crosslinker to be 1 wt. % to investigate the stability of the systems. A system of both PEI and TAS crosslinkers was also tested with different ratios, fixing the total amount of crosslinkers to be 1 wt. % to assess the compatibility between the two systems. Low PEI concentration is preferred to decrease the cost of the solution. In some non-limiting examples, TAS can replace all the PEI.

Increasing the percentage of TAS and decreasing PEI results in weak gels because the amount of amine in the solution was less in the functionalized silica compared to that in the high MW PEI. The concentration of TAS depends on the concentration of the polymer and the required gel strength. Too high concentration might degrade the gel due to over crosslinking. TAS can replace PEI or decrease the amount of PEI used. However, using a PEPTAS double crosslinking system with a ratio of 0.9:0.1 to 0.1:0.9 provides higher storage modulus compared to the system with similar wt. % PEI crosslinker alone, as the effect of the presence of silica in the backbone has exceeded the effect of decreasing the crosslinking sites. The PEI/TAS ratio is selected to provide the desired gel strength, and TAS concentration depends on the PAM concentration.

The amount of NS in the present system depends on the TAS size. At the studied range 1 wt. %, NS is enough to prevent the settling of TAS. Other sizes of NS can be used, but the concentration might vary. The main advantage of using NS is preventing TAS settling. Moreover, increasing the NS concentration improves the gel strength. However, if a high concentration is pumped at a high rate, there can be erosion of the tubing. NS can be optional with PEI. It increases the gel strength of the produced gel.

TAS is developed to replace PEI. Compared to PEI, TAS is more environmentally friendly, has lower cost, and provides strong stable gel. When TAS is used, there is no need to add PEI, or the amount or concentration of PEI in the solution can be reduced.

Example 2-3. Compatibility with Saline Water

The behavior of the prepared gel in an environment of saline water is evaluated. The solution of PAM/TAS/NS was prepared using seawater. The Arabian Gulf sea water was used. It has high salinity content compared to other seas. 1 wt. % of a chelating agent, Ethylene diamine tetra acetic acid (EDTA), is used to improve compatibility and avoid salt precipitation. DTPA, HEDTA and their derivatives can also be used. A low concentration of the chelating agent is preferred to prevent scale precipitation.

TABLE 4

Results of Storage moduli for 9% PAM and TAS/NS in Seawater

| Type | Concentrations, wt. % | Sydansk Code | Storage Modulus, Pa | Water |
|---|---|---|---|---|
| NS/TAS | 2/2 | I | 1868 | Fresh |
| NS/TAS | 2/2 | I | 2965 | Seawater |
| NS/TAS/EDTA | 2/2/1 | F | 1796 | Seawater |

Field produced water and formation water can be also used.

The above examples show that triamine functionalized silica (30-100 μm) can be used to replace and/or supplement PEI in crosslinker systems for crosslinking 7-9 wt. % PAM and PAtBA at a temperature of 90-150° C. in fresh or high salinity water. Small sizes of silica are preferred to avoid settling and reduce the concentration of NS. However, it might increase the cost since synthesis this type of materials is complicated at nano-scale. Lower or higher concentration of PAM can be used depending on the required gel strength, and the ratio of crosslinker can be selected accordingly.

PAtBA is another non-limiting example of polyacrylamide polymers that can be used in the present system. However, PAtBA is more expensive compared to PAM. High temperatures are preferred (90-150° C.).

Example 2-4. Technology Readiness Level (TRL)

Figure 3:
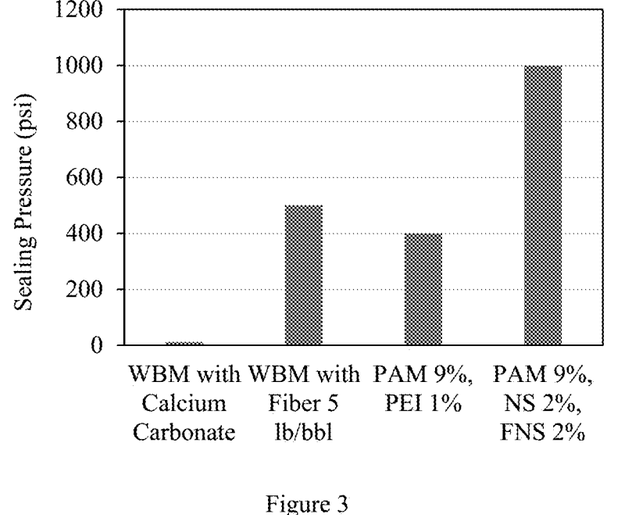
FIG. 3 shows the sealing pressure results from the permeability plugging test.
Figure 4:
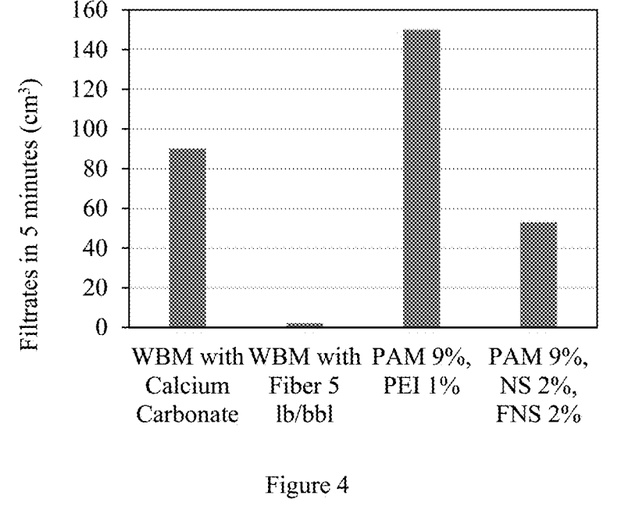
FIG. 4 shows the filtrates volumes from the permeability plugging test.

Viscosity measurement and fracture sealing test were conducted in order to evaluate the performance of the invented polymeric formulation of PAM crosslinked with functionalized silica. Two different LCM are selected for the comparison as an example of the current technologies used for fluid loss treatment and wellbore strengthening. A Permeability Plugging Tester (PPT) from OFITE is used to evaluate the fracture sealing efficiency. Then the cumulative filtrates volume and sealing pressure are used as performance indicators. The fracture sealing tests were conducted for the two reference samples, and the two PAM samples, one crosslinked with PEI and other with functionalized silica. FIGS. 3 and 4 show the sealing pressure and cumulative filtrates volume for all the samples. The polymeric gel formulated with functionalized silica gave the highest sealing pressure (1000 psi), and the filtrates volume was less than the one with crosslinked with the PEI.

Figure 5:
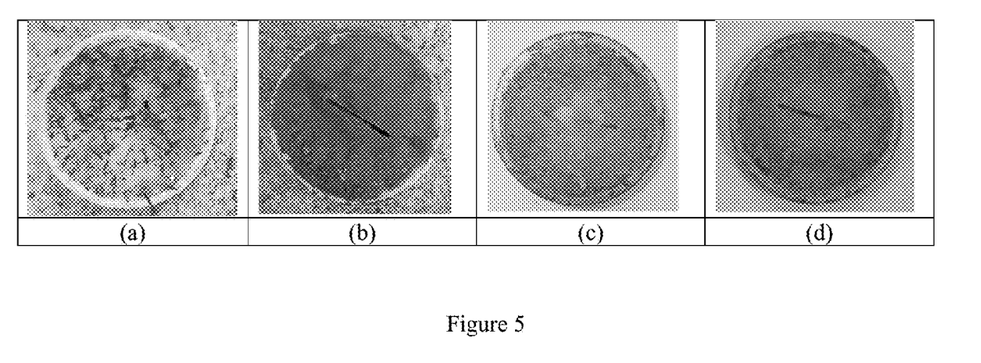
FIG. 5 shows the photos of artificially fractured aluminum discs after the fracture sealing test with different fluids.

FIG. 5 shows the photos of artificially fractured aluminum discs following the fracture sealing test with different fluids: (a) WBM with Fiber 5 lb/bbl; (b) WBM with Calcium Carbonate; (c) PAM 9%, NS 2%, and FNS 2%; and (d) PAM 9% and PEI 1%.

Figure 6:
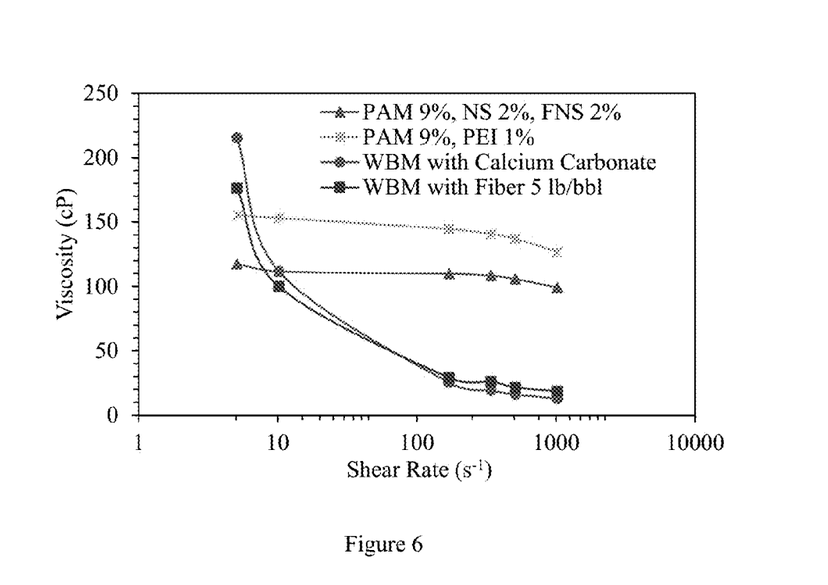
FIG. 6 shows the viscosity measurements at room temperature.

For polymeric gel used as LCM, the fluid is required to have moderate low viscosity at surface to facilitate the pumping of fluid into the well and to have high injectivity. FIG. 6 shows measurements of viscosity at different shear using viscometer at room temperature. The results show that for the same PAM concentration of 9 wt. % the PAM/NS/FNS system have lower viscosity compared to the PAM/PEI.

Figure 7:
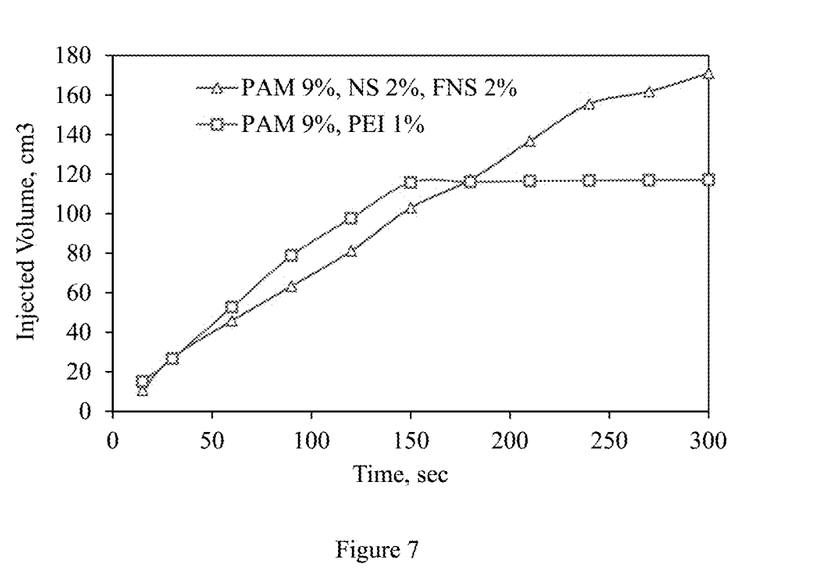
FIG. 7 shows the results of injectivity test for PAM/PEI formula compared with the invented formula of PAM crosslinked with FNS.

Moreover, an injectivity test demonstrated the better injectivity of the PAM/NS/FNS polymeric gel compared to the PAM/PEI formula. The injectivity test was conducted using 500 cm 3 cell connected with a 0.25 ID inches tube put under diffrentioal pressure of 250 psi at 130° C. The results are shown in FIG. 7.

In summary, the examples show the following results:

TAS can be used to crosslink PAM and PAtBA and form a flowing gel on the Sydansk coding system at 90-150° C. However, settling of silica was observed at TAS concentrations higher than 0.5 wt. %.

Adding low concentration (1-2 wt. %) of 20-80 nm non-functionalized nanosilica can result in the suspension of TAS and prevent the settling, thereby resulting in reinforced gels. 1 wt. % of this size is enough to prevent TAS settling. Higher concentrations can be used to reinforce the gel. The required concentration can be lower or higher depending on the TAS size.

Increasing the concentration of nanosilica in the present crosslinker systems can enhance the strength of the formed gels. Further, increasing conventional PEI crosslinker in PAM can lead to synergistic effects. TAS can be used to replace PEI. A low concentration of the TAS and PEI mixture or TAS only can be used in the present system.

The present technology is compatible with fresh and saline water, which could provide higher storage moduli compared to the mixture of polymer/crosslinker solutions prepared with deionized water.

Using a low concentration of (e.g., 1%) a chelating agent, e.g., EDTA DTPA, HEDTA and their derivatives, can prohibit the formation of salt precipitates which leads to formation damage due to calcium sulfate precipitation from the reaction of the high concentration of sulfates in the saline water with calcium carbonates in sandstone and carbonate rocks.

The present technology has a reduced cost in comparison with PEI since it uses silica, which is cheaper and more accessible than PEI.

It should be understood that various changes and modifications to the presently disclosed embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of preventing or reducing loss circulation during drilling operations in an oil and gas well, the method comprising:
   mixing a plurality of gel material components comprising polyacrylamide (PAM), triamine silica (TAS), and nanosilica (NS) at a surface temperature of an oil and gas well to form a mixture;
   injecting the mixture through a tubing in the oil and gas well; and
   allowing the mixture to form a gel material in the oil and gas well.

2. The method of claim 1 wherein a concentration of the polyacrylamide (PAM) is 9 wt. %.

3. The method of claim 1 further comprising providing to the mixture a chelating agent comprising at least one of diethylenetriamine pentaacetic acid (DTPA), hydroxy ethylenediaminetriacetic acid (HEDTA), or ethylene diamine tetra acetic acid (EDTA).

4. The method of claim 3, wherein the chelating agent comprises ethylene diamine tetra acetic acid (EDTA) in a concentration of up to 1 wt. %.

5. A method of wellbore strengthening, LCMs, and/or water shut-off applications at high temperatures in oil and gas well drilling operations, the method comprising:
   mixing a plurality of gel material components comprising polyacrylamide (PAM), triamine silica (TAS), and nanosilica (NS) at a surface temperature of an oil and gas well to form a mixture;
   injecting the mixture through a tubing in the oil and gas well; and
   allowing the mixture to form a gel material in the oil and gas well.

6. The method of claim 5 further comprising adding polyethyleneimine (PEI) to the mixture.

7. The method of claim 5 further comprising polyacrylamide tert-butyl (PAtBA).

8. The method of claim 5, wherein a concentration of the polyacrylamide (PAM) is 9 wt. %.

9. The method of claim 5 further comprising providing to the mixture a chelating agent comprising at least one of diethylenetriamine pentaacetic acid (DTPA), hydroxy ethylenediaminetriacetic acid (HEDTA), or ethylene diamine tetra acetic acid (EDTA).

10. The method of claim 9, wherein the chelating agent comprises ethylene diamine tetra acetic acid (EDTA) in a concentration of up to 1 wt. %.

* * * * *